(12) United States Patent
Kim

(10) Patent No.: US 7,370,138 B2
(45) Date of Patent: May 6, 2008

(54) MOBILE COMMUNICATION TERMINAL INCLUDING NAND FLASH MEMORY AND METHOD FOR BOOTING THE SAME

(75) Inventor: Hyung-Hoon Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 401 days.

(21) Appl. No.: 10/967,573

(22) Filed: Oct. 18, 2004

(65) Prior Publication Data

US 2005/0251672 A1    Nov. 10, 2005

(30) Foreign Application Priority Data

May 6, 2004    (KR) .................... 10-2004-0031719

(51) Int. Cl.
*G06F 12/00*    (2006.01)
*G06F 12/16*    (2006.01)

(52) U.S. Cl. ........................... 711/103; 714/6; 714/805

(58) Field of Classification Search ................ 711/103; 714/6, 805

See application file for complete search history.

(56) References Cited

U.S. PATENT DOCUMENTS

| | | | |
|---|---|---|---|
| 6,088,759 A * | 7/2000 | Hasbun et al. .............. 711/103 |
| 6,363,492 B1 * | 3/2002 | James et al. .................... 714/1 |
| 6,823,435 B1 * | 11/2004 | Wisor .......................... 711/170 |
| 7,027,805 B1 * | 4/2006 | Seike et al. .................. 455/418 |
| 7,038,961 B2 * | 5/2006 | Sakata et al. ............... 365/205 |
| 7,073,016 B2 * | 7/2006 | Zitlaw ......................... 711/103 |
| 2004/0017708 A1 * | 1/2004 | Choi et al. .................... 365/200 |
| 2004/0076069 A1 * | 4/2004 | Voth et al. .................... 365/232 |
| 2005/0108500 A1 * | 5/2005 | Kishida et al. ............. 711/218 |
| 2005/0160219 A1 * | 7/2005 | Oh .............................. 711/103 |

* cited by examiner

*Primary Examiner*—Sanjiv Shah
*Assistant Examiner*—Daniel Tsui
(74) *Attorney, Agent, or Firm*—The Farrell Law Firm, P.C.

(57) ABSTRACT

A mobile communication terminal with a NAND flash memory is described. The terminal includes a memory for storing address information indicative of a start address of a specific area including boot data to be read from the NAND flash memory; and a sub-controller for determining whether a predetermined block including the boot data of the NAND flash memory is a bad block incapable of being booted, requesting transmission of the address information from a main controller when the predetermined block is determined to be the bad block, and reading the boot data from the predetermined block of the NAND flash memory corresponding to the address information transmitted from the main controller. The main controller detects the address information stored in the memory upon receiving the transmission request of the address information from the sub-controller, and transmits the detected address information to the sub-controller.

10 Claims, 3 Drawing Sheets

MOBILE COMMUNICATION TERMINAL INCLUDING NAND FLASH MEMORY AND METHOD FOR BOOTING THE SAME

PRIORITY

This application claims priority to an application entitled "MOBILE COMMUNICATION TERMINAL INCLUDING NAND FLASH MEMORY AND METHOD FOR BOOTING THE SAME", filed in the Korean Intellectual Property Office on May 6, 2004 and assigned Serial No. 2004-31719, the contents of which are hereby incorporated by reference.

BACKGROUND OF THE INVENTION

1. Field of the Invention

The present invention relates to a mobile communication terminal, and more particularly to a mobile communication terminal including a NAND flash memory and a method for booting the same.

2. Description of the Related Art

Generally, a mobile communication terminal adapts a flash memory as a storage unit for storing codes, fonts, and contents. Representative flash memories are a NOR flash memory and a NAND flash memory.

The flash memory may be read or written in page units, or may be deleted in block page units (i.e., in units of several pages). In the case of 32 MB flash memory, a single page is composed of 512 bytes+16 bytes (i.e., a spare area), a single block is composed of 32 pages, and an overall flash memory is composed of 2048 blocks.

Memories manufactured by Intel or Fujitsu Corporations, etc. are NOR types, each of which has fewer errors, excellent data stability, and a semipermanent life span, such that they have been used mainly as a data storage medium of mobile communication terminals.

However, the current mobile communication terminal includes a camera, generates/stores images, gains access to the Internet to download multimedia data such as ringtones, and stores or transmits the downloaded data, whereas the old mobile communication terminal has established a telephone call and an SMS (Short Message Service) message with a called party, such that there is a need for a mass storage memory to support the aforementioned functions. With the increasing amount of data being stored in the memory of the mobile communication terminal, a large number of NAND flash memories, developed for use in digital cameras requiring mass storage data, have been increasingly applied to either the 2.5 generation mobile communication terminal and the third generation mobile communication terminal. Microsoft Corporation, OS (Operating System) development company, has recently designed an improved OS capable of supporting the NAND flash memory of such mobile communication terminals. This development is making the NAND flash memory increasingly popular.

The NAND flash memory is superior to a NOR flash memory in price, storage capacity, and response time. In other words, NAND is cheaper, larger, and faster. However, it also has disadvantages in that it increases power consumption of a mobile communication terminal as compared to the NOR flash memory and requires an SRAM (Static Random Access Memory) or an SDRAM (Synchronous Dynamic Random Access Memory) to transmit data.

Internal configuration of the NAND flash memory is classified into a main area and a spare area. The main area stores used data or a code image, and the spare area stores its own ECC (Error Correction Code) and a separate ECC associated with the main area. In this case, the reason why the ECC is stored in the spare area is that a bit error of at least one or two bits may occur when reading/writing data from/on the NAND flash memory, whereas the NAND flash memory has advantages in that it is a low-priced and mass storage memory. If the bit error is determined to be a 1-bit error indicative of a correctable error, the mobile communication terminal corrects the 1-bit error such that it records the corrected data. If the bit error is determined to be more than a 2-bit error indicative of a uncorrectable error, the mobile communication terminal marks a bad block on the spare area, such that it prevents the bad block from being used in the future.

The bad block is classified into an initial bad block and a run-time bad block. The initial bad block is indicative of a block generated when a memory cell is broken during an initial fabrication time of the NAND flash memory. The run-time block is indicative of a bad block generated when the NAND flash memory is used.

If a bad block occurs in a specific position where code is stored when the mobile communication terminal stores not data but the code, unexpected problems are encountered. If a first value of the position where the code is stored is changed to a second value, it is impossible to predict operations of the mobile communication terminal at a position, where the first value has been changed to the second value, while the mobile communication terminal reads/executes the code.

Particularly, if a bad block occurs in an area where a boot code is stored, a mobile communication terminal including the NAND flash memory cannot be used even though it is sold in the market place. In more detail, the boot code stored in a storage unit and is executed when the mobile communication terminal is powered on, it receives image data (e.g., application code, font, binary content, etc.) from a computer (e.g., a personal computer), and stores the received image data in the NAND flash memory in such a way that it can download such image data from the computer. As a result, if the bad block occurs in the area where the boot code is stored, the mobile communication terminal including the NAND flash memory cannot be used. Typically, there is a need for the mobile communication terminal to include the aforementioned booting and download functions.

Additionally, the mobile communication terminal is classified into a single-chip (i.e., a modem chip) configuration and a dual-chip (i.e., a modem chip and an application chip) configuration. General booting operations at a time when the mobile communication terminal uses the NAND flash memory are as follows:

A controller for controlling the NAND flash memory exists in a processor (also called a control unit) of a mobile communication terminal. The NAND flash memory controller includes an internal buffer, a control register, and a boot H/W (Hardware) logic. If the mobile communication terminal is powered on, the NAND flash memory controller is operated. If the boot hardware logic contained in the NAND flash memory controller reads data of several kbytes from among data stored in the NAND flash memory's predetermined block currently storing boot data, and stores the read data in the internal buffer, the read boot data is operated. Generally, the block for storing the boot data is determined to be the 0-th block.

However, if a page number or block number indicative of an operation target is mistakenly transmitted (e.g., the page number or block number is determined to be '0' and is then transmitted) so that the 0-th block is unexpectedly erased when the mobile communication terminal erases or records desired data on the NAND flash memory, the boot data must be rewritten to boot the mobile communication terminal. If a specific block (i.e., the 0-th block) for storing the booting information of the NAND flash memory is erased when the mobile communication terminal is booted, it is impossible to boot the mobile communication terminal. Furthermore, it is also impossible to boot the mobile communication terminal even when a run-time bad block occurs in the 0-th block during the operation time of the mobile communication terminal.

SUMMARY OF THE INVENTION

Therefore, the present invention has been made in view of the above problems, and it is an object of the present invention to provide a mobile communication terminal capable of being booted even though an unexpected error occurs in a block currently storing boot data of a NAND flash memory, and a method for controlling the same.

In accordance with one aspect of the present invention, the above and other objects can be accomplished by the provision of a mobile communication terminal with a NAND flash memory, including a memory for storing address information indicative of a start address of a specific area including boot data to be read from the NAND flash memory; a sub-controller for determining whether a predetermined block including the boot data of the NAND flash memory is determined to be incapable of being booted, requesting transmission of the address information from a main controller when the predetermined block is determined to be incapable of being booted, and reading the boot data from the predetermined block of the NAND flash memory corresponding to the address information transmitted from the main controller; and the main controller for detecting the address information stored in the memory upon receiving the transmission request of the address information from the sub-controller, and transmitting the detected address information to the sub-controller.

In accordance with another aspect of the present invention, there is provided a method for booting a dual-chip mobile communication terminal that includes a memory for storing address information indicative of a start address of a specific area having boot data to be read from the NAND flash memory, a main controller, and a sub-controller, the method including determining, by the sub-controller, whether a predetermined block including the boot data of the NAND flash memory is determined to be incapable of being booted; requesting transmission of the address information stored in the memory from a main controller when the predetermined block is determined to be incapable of being booted; detecting, by the main controller, the address information stored in the memory upon receipt of the address information transmission request, and transmitting the detected address information to the sub-controller; and reading, by the sub-controller, the boot data from the predetermined block of the NAND flash memory corresponding to the transmitted address information.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
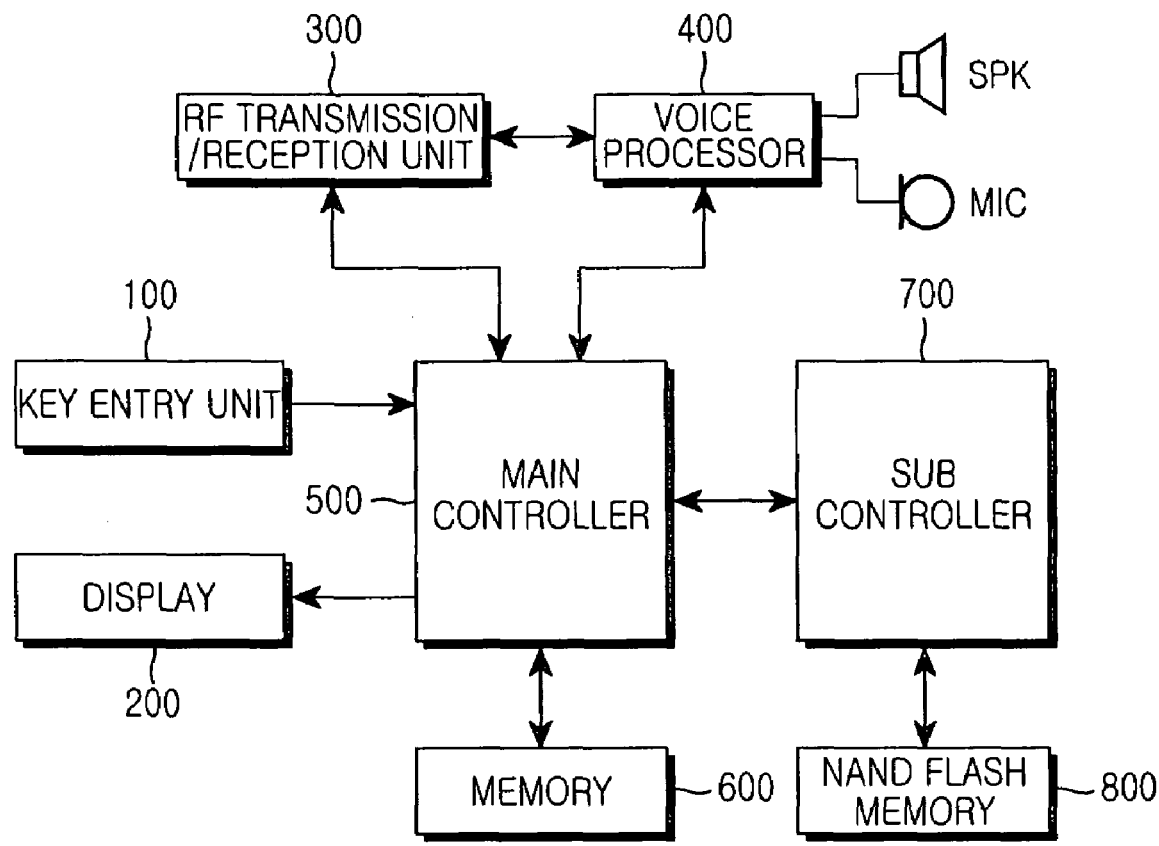
FIG. 1 is a block diagram illustrating a mobile communication terminal in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention unclear.

FIG. 1 is a block diagram illustrating a mobile communication terminal in accordance with a preferred embodiment of the present invention. Referring to FIG. 1, the mobile communication terminal includes a key entry unit 100, a display 200, an RF (Radio Frequency) transmission/reception unit 300, a voice processor 400 having a speaker and a microphone, a main controller 500, a memory 600, a sub-controller 700, and a NAND flash memory 800.

The key entry unit 100 is configured in the form of a key matrix, includes character keys, number keys, a variety of function keys, and an external volume key, and outputs a key entry signal corresponding to the user-entry key to the main controller 500.

The display 200 may be configured in the form of an LCD (Liquid Crystal Display), etc., and outputs a variety of display data generated by the mobile communication terminal.

The RF transmission/reception unit 300 acts as an RF unit, and is indicative of all the RF processors, for example, an HF (High Frequency) processor, an IF (Intermediate Frequency) processor, and a baseband processor. The RF transmission/reception unit 300 transmits or receives voice, text, image, and control data upon receiving a control signal from the main controller 500.

The voice processor 400 modulates an electric signal received from a microphone into voice data, demodulates the coded voice data received from the RF transmission/reception unit 300 into an electric signal, and outputs the demodulated signal to a speaker.

The main controller 500 controls overall operations of the mobile communication terminal according to the present invention. If the sub-controller 700 receives a transmission request for address information indicative of a start address of an area including the boot data to be read from the NAND flash memory 800, the main controller 500 detects the address information stored in the memory 600, and transmits the detected address information to the sub-controller 700.

The memory 600 stores various information required for controlling operations of the mobile communication terminal. The memory 600 stores the address information when the sub-controller performs the booting operation.

Figure 2:
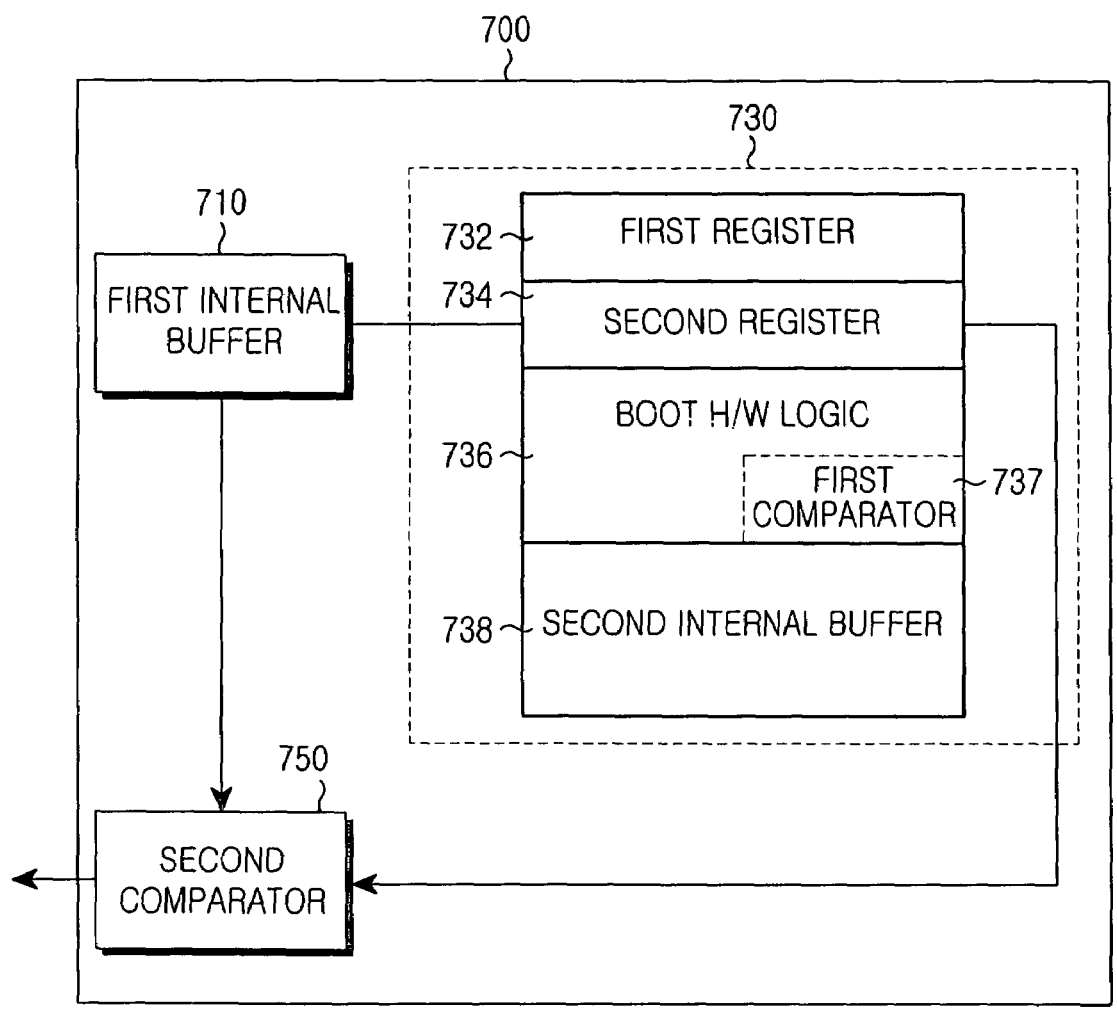
FIG. 2 is a detailed block diagram illustrating a sub-controller of FIG. 1 in accordance with a preferred embodiment of the present invention.

FIG. 2 is a detailed block diagram illustrating the sub-controller 700 of FIG. 1 in accordance with a preferred embodiment of the present invention. Referring to FIG. 2, the sub-controller 700 includes a first internal buffer 710, a controller 730 for controlling the NAND flash memory 800, and a second comparator 750. In this case, the controller 730 includes a first register 732, a second register 734, a boot H/W (Hardware) logic 736 having a first comparator 737, and a second internal buffer 738.

When the mobile communication terminal is powered on, the boot H/W logic 736 of the sub-controller 700 reads data stored in a spare area of a predetermined block (e.g., the 0-th block) of the NAND flash memory 800 storing the boot data, and compares the read data with other data prestored in the boot H/W logic 736 using a first comparator 737. For example, if the boot H/W logic 736 automatically reads data of 3 kbytes from the 0-th block of the NAND flash memory when the mobile communication terminal is booted, it reads the remaining data other than ECCs of the main and spare areas from the spare area of six pages from a first page to a sixth page of the 0-th block.

The first comparator 737 compares the read data with the prestored data of the boot H/W logic 736. If the read data is equal to the prestored data of the boot H/W logic 736, the first comparator 737 outputs the value of '1' to the first register 732. Otherwise, if the read data is different from the prestored data of the boot H/W logic 736, the first comparator 737 outputs the value of '0' to the first register 732. In this case, if the first comparator 737 outputs the value of '1' to the first register 732, the mobile communication terminal normally performs the booting operation. Otherwise, if the first comparator 737 outputs the value of '0' to the first register 732, the sub-controller 700 recognizes the read 0-th block as a bad block incapable of being booted, and requests transmission of address information, indicative of either a block storing boot data or address information indicating individual starting addresses of the block and the page, from the main controller 500 (FIG. 1).

Referring to FIGS. 1 and 2, if the main controller 500 transmits the address information detected from the memory 600 to the first internal buffer 710 upon receipt of the address information transmission request, the first internal buffer 710 temporarily stores the address information, and transmits the address information to the second register 734. Thereafter, the second register 734 temporarily stores the address information. Information stored in the second register 734 determines whether the boot H/W logic 736 reads boot data positioned in any block of the NAND flash memory 800 using the second internal buffer 736.

The first internal buffer 710 may be connected to the second register 734 via a switch. In this case, the switch can be controlled using the address information along with a switching control signal by the main controller 500 transmits. In more detail, if the main controller 500 transmits the switching control signal, the first internal buffer 710 transmits the address information to the second register 734.

The second comparator 750 compares the address information of the first internal buffer 710 with that of the second register 734. If the address information of the first internal buffer 710 is equal to that of the second register 734, the second comparator 750 outputs the output signal of '1' to the main controller 500. Otherwise, if the address information of the first internal buffer 710 is different from that of the second register 734, the second comparator 750 outputs the output signal of '0' to the main controller 500.

In this case, the second comparator 750 outputting the value of '1' to the main controller 500, means that the address information has been normally stored in the second register 734 of the sub-controller 700. The second comparator 750 outputting the value of '0' to the main controller 500, means that the address information has not been normally stored in the second register 734 of the sub-controller 700. Therefore, if the second comparator 750 of the sub-controller 700 outputs the value of '1', the main controller 500 interrupts a current process. If the second comparator 750 outputs the value of '0', the main controller 500 transmits address information including a start address of another spare value to the first internal buffer 710.

The boot H/W logic 736 reads the start address value of the address information stored in the second register 734, retrieves boot data from a predetermined block area of the NAND flash memory 800 corresponding to the read value, and stores the retrieved boot data in the second internal buffer 738.

Figure 3:
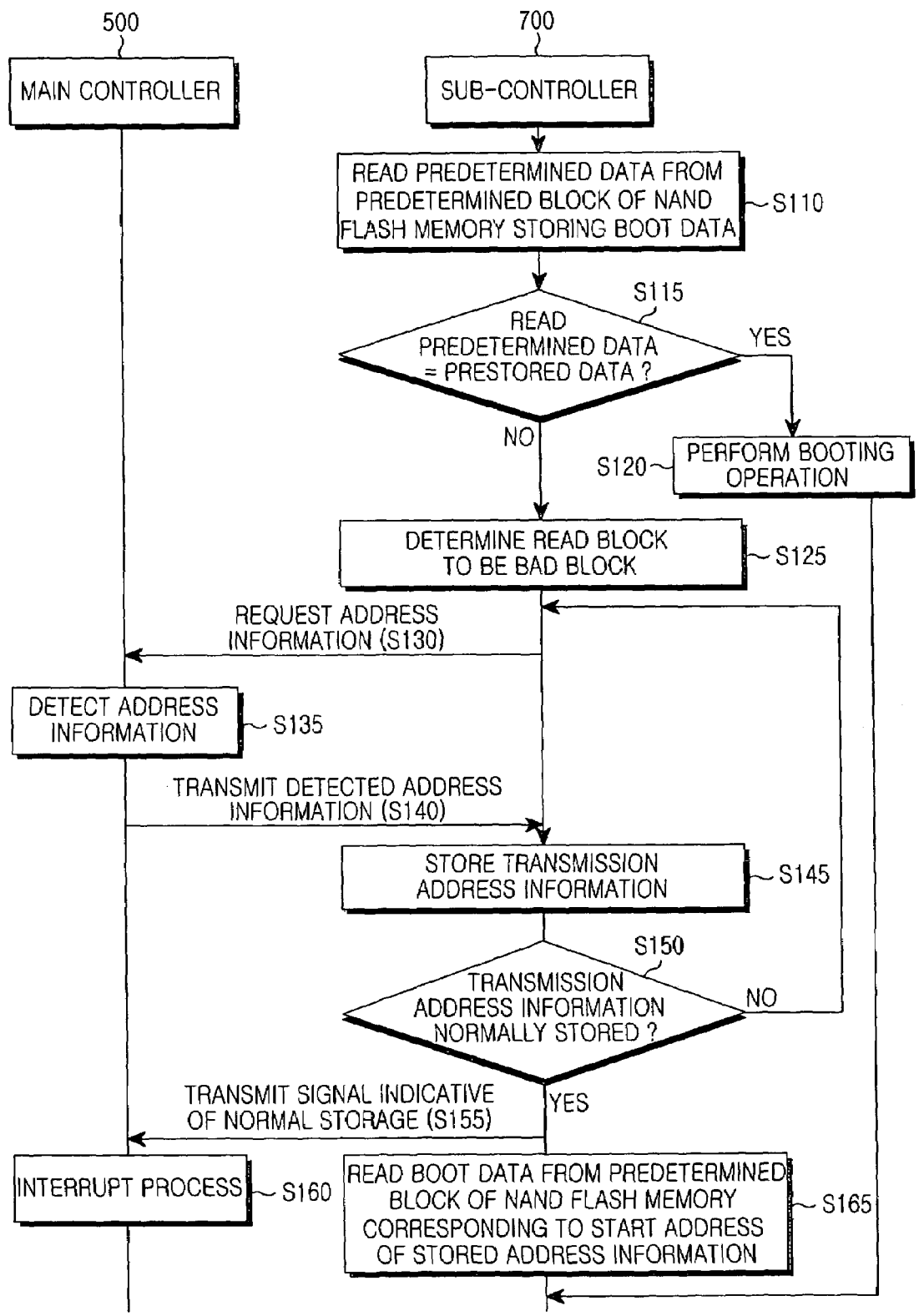
FIG. 3 is a flow chart illustrating a booting procedure for use in the mobile communication terminal in accordance with a preferred embodiment of the present invention.

FIG. 3 is a flow chart illustrating a booting procedure for use in the mobile communication terminal in accordance with a preferred embodiment of the present invention. When the mobile communication terminal is powered on, the sub-controller 700 reads data stored in a spare area of a predetermined block (e.g., the 0-th block) of the NAND flash memory 800 (FIG. 1) at step S110. In this case, the predetermined block of the NAND flash memory 800 is indicative of a specific block for storing data generated before the mobile communication terminal is booted.

At step S115, the sub-controller 700 compares the read data with prestored data of the sub-controller 700, and determines whether the read data is equal to the prestored data of the sub-controller 700. If the read data is equal to the prestored data of the sub-controller 700, the sub-controller 700 normally performs the booting operation at step S120. Otherwise, if the read data is different from the prestored data of the sub-controller 700 at step 115, the sub-controller 700 recognizes the read 0-th block as a bad block incapable of being booted at step S125.

At step S130, the sub-controller 700 requests transmission of address information, indicative of either a block storing the boot data or address information indicating individual starting addresses of the block and the page, from the main controller 500.

At step S135 the main controller 500 detects the address information requested by the sub-controller from the memory 600. At step S140 the main controller 500 transmits the detected address information to the sub-controller 700.

Upon receipt of the requested address information, the sub-controller 700 stores the received address information at step S145. At step S150 the sub-controller 700 compares the stored address information with address information received from the main controller 500, and determines whether the address information is normally stored. If the stored address information is not equal to the address information received from the main controller 500 (i.e., if the output value of '0' is generated), the sub-controller 700 returns to step S130 to request address information from the main controller 500. Therefore, the main controller 500 transmits address information including a start address of another spare value to the sub-controller 700. Otherwise, if the stored address information is equal to the address information received from the main controller 500 at step S150, at step S155 the sub-controller 700 outputs a predetermined signal (e.g., the output value of '1') indicating that the address information transmitted from the main controller 500 has been normally stored.

Upon receiving an output signal from the sub-controller 700, the main controller 500 interrupts the current process at step S160.

At step S165 the sub-controller 700 reads the boot data from a predetermined block of the NAND flash memory 800

(FIG. 1) corresponding to the start address of the address information stored at the above step S145, and executes the read boot data.

It is apparent to those skilled in the art from the above description, the present invention can allow a mobile communication terminal to be normally booted even though an unexpected error (e.g., a bad block) occurs in a NAND flash memory block currently storing the boot data of the mobile communication terminal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile communication terminal with a NAND flash memory, comprising:

a memory for storing address information indicative of a start address of a specific area including boot data to be read from the NAND flash memory;

a sub-controller for determining whether a predetermined block including the boot data of the NAND flash memory is incapable of being booted, requesting transmission of the address information from a main controller when the predetermined block is incapable of being booted, and reading the boot data from the predetermined block of the NAND flash memory corresponding to the address information transmitted from the main controller, wherein the sub-controller includes a first internal buffer for temporarily storing the address information transmitted from the main controller, and a controller for determining whether the predetermined block including the boot data of the NAND flash memory is incapable of being booted, requesting transmission of the address information from a main controller when the predetermined block is incapable of being booted, receiving the requested address information from the first internal buffer, and reading the boot data from the predetermined block of the NAND flash memory corresponding to the address information, and wherein the controller includes a boot H/W (Hardware) logic including a first comparator, which compares predetermined data read from the predetermined block with prestored data of the sub-controller for determining whether the predetermined block storing the boot data of the NAND flash memory is the block incapable of being booted, and reading the boot data from the predetermined block of the NAND flash memory corresponding to the address information transmitted from the first internal buffer, a first register for temporarily storing the comparison result value of the first comparator, a second register for receiving the address information from the first internal buffer, and temporarily storing the received address information, and a second internal buffer for temporarily storing the boot data read by the boot H/W logic; and a second internal buffer for temporarily storing the boot data read by the boot H/W logic; and the main controller for detecting the address information stored in the memory upon receiving the transmission request of the address information from the sub-controller, and transmitting the detected address information to the sub-controller.

2. The mobile communication terminal according to claim 1, wherein the start address of the address information is selected from one of a block number of the NAND flash memory, and a page number.

3. The mobile communication terminal according to claim 1, wherein the sub-controller further includes a second comparator for comparing the address information stored in the first internal buffer with the other address information transmitted to the controller, and outputting a signal indicative of the comparison result to the main controller.

4. The mobile communication terminal according to claim 1, wherein the sub-controller receives the comparison result from the first comparator, and determines that the read predetermined block is the block incapable of being booted when the predetermined data read from the predetermined block is different from the prestored data.

5. The mobile communication terminal according to claim 3, wherein the second comparator outputs an output signal to the main controller indicating that the address information transmitted from the main controller has been normally stored in the controller when the address information stored in the first internal buffer is equal to the address information transmitted to the controller.

6. The mobile communication terminal according to claim 3, wherein the second comparator outputs a predetermined signal from the main controller to request transmission of address information of a start address including another spare value, when the address information stored in the first internal buffer is different from the other address information stored in the second register.

7. A method for booting a dual-chip mobile communication terminal having of a memory for storing address information indicative of a start address of a specific area having boot data to be read from a NAND flash memory, a main controller, and a sub-controller, comprising the steps of:

a) the sub-controller determining whether a predetermined block including the boot data of the NAND flash memory is incapable of being booted, wherein step (a) further includes a1) the sub-controller reading predetermined data of the predetermined block, a2) comparing the read predetermined data with prestored data of the sub-controller, and a3) determining the predetermined block incapable of being booted when the read predetermined data is different from the prestored data;

b) requesting transmission of the address information stored in the memory from a main controller when the predetermined block is incapable of being booted;

c) the main controller detecting the address information stored in the memory upon receipt of the address information transmission request and transmitting the detected address information to the sub-controller; and d) the sub-controller reading the boot data from the predetermined block of the NAND flash memory corresponding to the transmitted address information.

8. The method according to claim 7, wherein the start address of the address information is selected from one of a block number of the NAND flash memory and a page number.

9. The method according to claim 7, wherein step (d) further comprises:
- d1) the main controller receiving the address information, and storing the received address information;
- d2) comparing the stored address information with other address information transmitted from the main controller;
- d3) outputting an output signal indicating that the address information transmitted from the main controller has been normally stored, to the main controller when the stored address information is equal to the address information transmitted from the main controller; and
- d4) the sub-controller reading the boot data from the predetermined block of the NAND flash memory corresponding to the stored address information.

10. The method according to claim 9, further comprising:
- d5) requesting transmission of address information of a start address including a spare value from the main controller when the stored address information is different from the other address information transmitted from the main controller.

* * * * *